(12) United States Patent
Yang et al.

(10) Patent No.: US 10,233,970 B2
(45) Date of Patent: Mar. 19, 2019

(54) JOURNAL BEARINGS WITH SURFACE FEATURES FOR IMPROVED BEARING OIL SUPPLY

(71) Applicant: GM GLOBAL TECHNOLOGY OPERATIONS LLC, Detroit, MI (US)

(72) Inventors: Bo Yang, Troy, MI (US); Fanghui Shi, Bloomfield Hills, MI (US); John B. Fisher, Flint, MI (US); Quintin A. Wilson, Commerce, MI (US); Massimiliano Sala, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 62 days.

(21) Appl. No.: 15/402,653

(22) Filed: Jan. 10, 2017

(65) Prior Publication Data

US 2018/0195555 A1   Jul. 12, 2018

(51) Int. Cl.
*F01M 11/02* (2006.01)
*F16C 33/04* (2006.01)
(Continued)

(52) U.S. Cl.
CPC ....... *F16C 33/046* (2013.01); *F01M 11/0004* (2013.01); *F01M 11/02* (2013.01);
(Continued)

(58) Field of Classification Search
CPC .. F16C 33/046; F16C 33/1065; F16C 17/022; F01M 11/02; F01M 11/0004; F01M 2011/026
See application file for complete search history.

(56) References Cited

U.S. PATENT DOCUMENTS 2,004,254 A   6/1935   Taub
3,449,028 A   6/1969   DeHart
(Continued)

FOREIGN PATENT DOCUMENTS

DE   2711983 A1   9/1977
DE   19826460 A1   12/1999
(Continued)

*Primary Examiner* — Jacob Amick
*Assistant Examiner* — Charles Brauch
(74) *Attorney, Agent, or Firm* — Quinn IP Law (57) ABSTRACT

Disclosed are journal bearing assemblies, methods for making and methods for using journal bearing assemblies, and motor vehicles employing journal bearing assemblies. A disclosed friction-reducing journal bearing assembly includes a first (upper) bearing shell insert and a second (lower) bearing shell insert. Each insert mounts inside a bore, e.g., of an engine block or piston connecting rod, and has an arcuate inner-diameter (ID) surface. These ID surfaces are adjoined at opposing ends thereof to cooperatively define a cylindrical channel that receives therethrough a journal portion of a shaft (e.g., crankshaft or crank pin). The inner-diameter and/or outer-diameter (OD) surface of the second insert includes one or more axially elongated and/or one or more axially angled grooves, each of which extends only partially across the axial width of the shell insert. The lower insert may be fabricated with two axially elongated grooves extending generally orthogonally from respective edges of the insert.

20 Claims, 3 Drawing Sheets

(51) Int. Cl.

| | |
|---|---|
| *F16C 17/02* | (2006.01) |
| *F16C 33/10* | (2006.01) |
| *F01M 11/00* | (2006.01) |

(52) U.S. Cl.
CPC ........ *F16C 17/022* (2013.01); *F16C 33/1065* (2013.01); *F01M 2011/026* (2013.01); *F16C 2360/22* (2013.01)

(56) References Cited

U.S. PATENT DOCUMENTS

| | | | |
|---|---|---|---|
| 3,625,580 A | 12/1971 | DeHart et al. | |
| 4,311,349 A | 1/1982 | Roberts | |
| 4,920,825 A * | 5/1990 | Okazaki | F02F 7/0046 |
| | | | 123/195 C |
| 5,009,522 A | 4/1991 | Hahn | |
| 5,425,584 A | 6/1995 | Ide | |
| 5,908,247 A | 6/1999 | Leuthold et al. | |
| 5,952,080 A | 9/1999 | Etsion et al. | |
| 6,176,621 B1 | 1/2001 | Naitoh et al. | |
| 8,151,758 B2 | 4/2012 | Ni et al. | |
| 8,247,932 B1 | 8/2012 | Larive et al. | |
| 8,672,551 B2 | 3/2014 | Ukai et al. | |
| 2003/0072506 A1 | 4/2003 | Mayer | |
| 2004/0042698 A1 | 3/2004 | Yamamoto et al. | |
| 2008/0253709 A1* | 10/2008 | Kikuchi | F01M 11/03 |
| | | | 384/473 |
| 2009/0116921 A1* | 5/2009 | Naumann | B21H 7/185 |
| | | | 409/131 |
| 2010/0170468 A1 | 7/2010 | Ni et al. | |
| 2012/0201485 A1* | 8/2012 | Kondo | F16C 9/04 |
| | | | 384/276 |
| 2012/0294558 A1* | 11/2012 | Ovares | F16C 9/02 |
| | | | 384/288 |

FOREIGN PATENT DOCUMENTS

| | | | |
|---|---|---|---|
| DE | 102010040156 A1 | 3/2012 | |
| DE | 102014000775 A1 * | 7/2015 | ............ F16C 37/002 |
| DE | 102014200594 A1 | 7/2015 | |
| GB | 2524490 A * | 9/2015 | .......... F16C 33/1065 |

* cited by examiner

JOURNAL BEARINGS WITH SURFACE FEATURES FOR IMPROVED BEARING OIL SUPPLY

INTRODUCTION

The present disclosure relates generally to friction-reducing bearing assemblies. More specifically, aspects of this disclosure relate to journal bearings for mounting internal combustion engine crankshafts and piston connecting rods.

Current production motor vehicles, such as the modern-day automobile, are originally equipped with a powertrain that operates to propel the vehicle and power the onboard vehicle electronics. The powertrain, which is inclusive of, and oftentimes misclassified as, a vehicle drivetrain, is generally comprised of a prime mover that delivers driving power to the vehicle's final drive system (e.g., rear differential, axle, and wheels) through a multi-speed power transmission. Automobiles have generally been powered by a reciprocating-piston type internal combustion engine because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid vehicles, on the other hand, utilize alternative power sources, such as battery and fuel-cell powered electric motors, to propel the vehicle, minimizing reliance on the engine for power and, thus, increasing overall fuel economy.

A typical overhead valve internal combustion engine includes an engine block with a series of cylinder bores, each of which has a piston reciprocally movable therein. Coupled to a top surface of the engine block is a cylinder head that cooperates with the piston and cylinder bore to form a variable-volume combustion chamber. These reciprocating pistons are used to convert pressure—generated by igniting a fuel-and-air mixture compressed inside the combustion chamber—into rotational forces to drive a crankshaft. The crankshaft, in turn, transmits torque and rotational power from the engine, e.g., through a flywheel, hydrokinetic torque converter, or clutch mechanism, to an automatic or manual transmission. Most prevalent power transmission designs employ a mechanical gear train, such as clutch actuated planetary gear sets, to adapt the torque and power output from the vehicle's prime mover(s). A drive shaft (or "propshaft") carries the adapted torque and power from the transmission to a differential assembly or transfer case for driving the vehicle's road wheels.

Many internal combustion engine architectures utilize assorted friction-reducing journal bearings to support the crankshaft in the engine block, as well as to secure the piston connecting rods to the crank pin journals. A journal bearing is a type of plain bearing that employs two opposing, semicircular inserts (known as "bearing shell halves") that are retained in a cylindrical bore in the connecting rod or block. A section of the bore may be provided with a removable cap to facilitate assembly of the journal and the bearing shells within the bore. Recesses may be formed at the split line between the two semicircular inserts to help prevent excessive wear of the bearing assembly caused, for example, by misalignment of the shells during assembly. A lubricant supply passage may be formed in the upper bearing shell and connected, through a fluid line, to the oil gallery of the engine. The lubricant supply passage feeds oil to the inner-diameter surface of the bearing to establish a lubricating film between the journal and the inner face of the bearing shells.

SUMMARY

Disclosed herein are friction-reducing journal bearing assemblies with surface features for improved bearing oil supply, methods for making and methods for using such journal bearing assemblies, internal combustion engine (ICE) assemblies with friction-reducing journal bearings, and motor vehicles equipped with such engines. By way of example, and not limitation, there are presented unique journal bearing designs with bearing shell inserts fabricated with surface features engineered to supply oil to specific locations identified as susceptible to cavitation. Surface cavitation is a type of impact fatigue that may be caused, for example, by the formation and collapse of gaseous or vaporous bubbles in the bearing's oil film under conditions of rapid pressure change. Disclosed bearing shell surface features improve the supply of oil to designated bearing surfaces to reduce the onset and extent of cavitation. As an example, the inner-diameter (ID) surface of a lower bearing shell insert may be fabricated with recessed, axially elongated and/or axially angled oil grooves. For some designs, the outer-diameter (OD) surface of a lower bearing shell insert may be fabricated with a circumferentially elongated backside oil groove that is fluidly coupled to through holes that transmit oil to the ID surface. As yet another example, the ID surface of a lower bearing shell insert may be fabricated with a pair of recessed, circumferentially elongated oil grooves connected via a V-shaped manifold groove at one end of the insert.

Attendant benefits for at least some of the disclosed concepts include increased oil supply to specifically designated bearing surfaces to thereby delay the onset and minimize the extent of liquid cavitation. This, in turn, helps to improve dynamic load bearing capacity and hydrodynamic stability. Disclosed journal bearing architectures help to attenuate noise and vibration, as well as reduce surface damage caused by cavitation phenomenon. For instance, in engine crankshaft applications, disclosed friction-reducing journal bearing assemblies help to eliminate the ticking noise that can occur at idle and other operating conditions for some engine platforms. Advantageously, the disclosed journal bearing assemblies can be modified and scaled for a wide array of vehicle and non-vehicle applications alike.

Aspects of the present disclosure are directed to friction-reducing, rotary-type journal bearing assemblies with surface features engineered to improve bearing oil supply to designated ID surface areas determined to be susceptible to cavitation. Disclosed, for example, is a journal bearing assembly for supporting a shaft passing through a bore. In this example, the journal bearing assembly includes a first (upper) bearing shell insert that mounts inside the bore and has a first arcuate inner-diameter (ID) surface. A second bearing shell insert mounts inside the bore, juxtaposed with the first insert, such that a second arcuate ID surface of the second insert adjoins at opposing ends thereof with opposing ends of the first ID surface to cooperatively define a bearing channel that receives therethrough a journal portion of the shaft. The inner-diameter and/or outer-diameter (OD) surface of the second bearing shell insert includes one or more axially elongated and/or one or more axially angled recessed grooves that extend partially, but not completely, across the axial width of the shell insert. For instance, the second ID surface may be fabricated with two axially elongated grooves, each extending generally orthogonally from a respective edge of the second bearing shell insert. As another option, the second ID surface may be fabricated with two axially angled grooves each extending at an oblique angle from a respective edge of the second bearing shell insert.

Other aspects of the present disclosure are directed to motor vehicles with reciprocating-piston-type engines employing friction-reducing, rotary-type journal bearing assemblies. A "motor vehicle," as used herein, may include any relevant vehicle platform, such as passenger vehicles (internal combustion engine, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, boats, airplanes, trains, etc. In an example, a motor vehicle is presented that includes a vehicle body with an engine compartment, and an internal combustion engine (ICE) assembly stowed inside the engine compartment. This ICE assembly includes an oil sump, an engine block with one or more crankshaft bores, and a crankshaft passing through the crankshaft bore(s).

Continuing with the foregoing example, the motor vehicle also includes one or more journal bearing assemblies composed of an upper shell insert interconnected with a lower shell insert. The upper shell insert is formed with a single-piece semicircular body that is mounted inside the crankshaft bore. The semicircular body of the upper shell insert has an arcuate inner-diameter surface, which includes a circumferentially elongated channel that receives oil from the oil sump of the ICE assembly. Like its counterpart, the lower shell insert is formed with a single-piece semicircular body that is also mounted inside the crankshaft bore. The lower shell insert's body has an arcuate ID surface adjoined at opposing ends thereof with opposing ends of the first ID surface to cooperatively define a cylindrical bearing channel receiving therethrough a journal portion of the engine's crankshaft. The ID and/or OD surface of the lower shell insert includes one or more axially elongated and/or axially angled recessed grooves that extend only partially across the axial width of the insert. Each groove helps to transmit oil received by the lower shell insert, from the oil sump, to one or more predetermined surface areas of the second ID surface.

Additional aspects of this disclosure are directed to methods for making and methods for using friction-reducing, rotary-type journal bearing assemblies. For instance, a method is disclosed for manufacturing a journal bearing assembly for rotatably supporting a shaft passing through a bore. The method includes, in any order and in any combination with any of the disclosed features: fabricating a first bearing shell insert that is configured to mount inside the bore and includes a first arcuate inner-diameter surface; and, fabricating a second bearing shell insert that is configured to mount inside the bore and includes a second arcuate ID surface adjoined at opposing ends thereof with opposing ends of the first ID surface to cooperatively receive therethrough a journal portion of the shaft. The ID and/or OD surface of the second bearing shell insert is fabricated with one or more axially elongated and/or one or more axially angled recessed grooves that extend only partially across the axial width of the insert. In an example, the first and/or second bearing shell inserts may be fabricated via casting, stamping, or molding each of the bearing shell inserts as a single-piece semicircular structure. In this regard, each of the recessed grooves may be fabricated as part of the stamping/casting/molding process, or via a separate precision machining process. It is also envisioned that one or more of the above-described oil passages be fabricated in the bore itself (e.g., in the bearing cap, crank case, etc.) as opposed to the OD of shells.

The above summary is not intended to represent every embodiment or every aspect of this disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Figure 1:
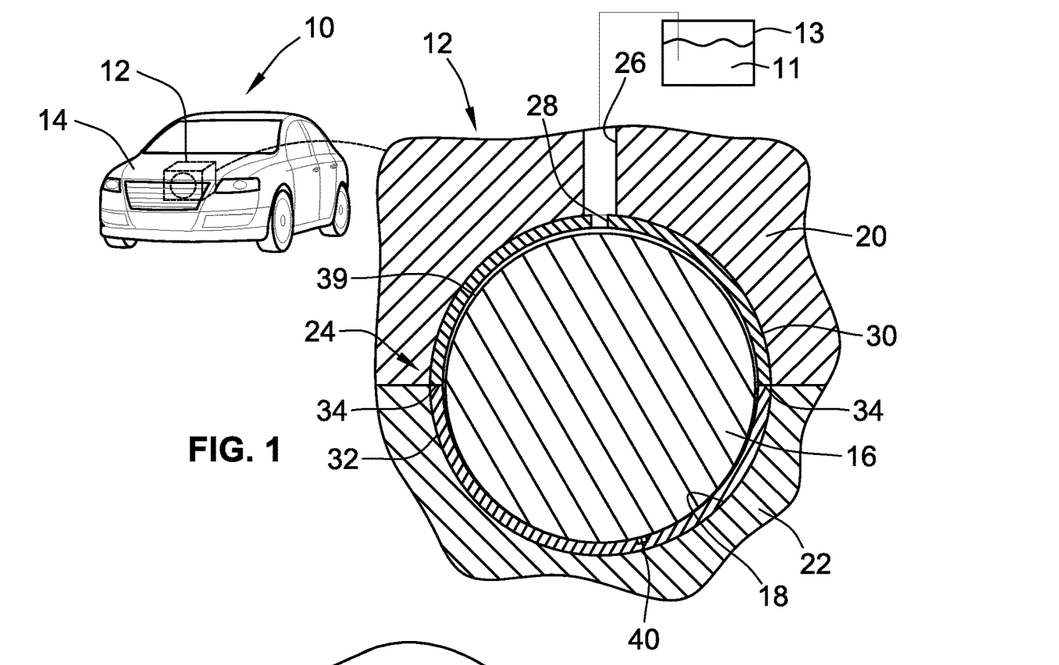
FIG. 1 is a front perspective-view illustration of a representative motor vehicle with an inset cross-sectional illustration of a select portion of a representative engine assembly with a crankshaft journal and bearing assembly in accordance with aspects of the present disclosure.

Referring now to the drawings, wherein like reference numbers refer to like features throughout the several views, there is shown in FIG. 1 a perspective-view illustration of a representative automobile, which is designated generally at 10 and portrayed herein for purposes of discussion as a four-door sedan-style passenger vehicle. Mounted at a forward portion of the automobile 10, e.g., aft of a front bumper fascia and grille and forward of a passenger compartment, is an internal combustion engine (ICE) assembly 12 housed within an engine compartment covered by an engine hood 14. The illustrated automobile 10—also referred to herein as "motor vehicle" or "vehicle" for short—is merely an exemplary application with which the novel aspects and features of this disclosure may be practiced. In the same vein, implementation of the present concepts for a crankshaft of an internal combustion engine configuration should also be appreciated as an exemplary application of the novel concepts disclosed herein. As such, it will be understood that aspects and features of the present disclosure may be applied to other engine architectures, implemented for other automotive applications, and utilized for any logically relevant type of motor vehicle. In the same vein, aspects of this disclosure can be utilized for non-vehicle based applications, such as industrial-grade machinery, construction equipment, turbines, electric motors and generators, etc. Lastly, the drawings presented herein are not necessarily to scale and are provided purely for instructional purposes. Thus, the specific and relative dimensions shown in the drawings are not to be construed as limiting.

Presented by the inset view of FIG. 1 is a cross-sectional illustration of the main journal portion of an engine crankshaft 16 that functions to translate the reciprocating motion of one or more pistons into rotational motion for driving a pair of road wheels of the vehicle 10. According to the illustrated example, the crankshaft 16 is rotatably carried within a cylindrical crankshaft bore 18 that is cooperatively defined by a bearing housing section of a cylinder block 20 and a detachable bearing cap or a crankcase 22 of ICE assembly 12. While only a single crankshaft bore 18 can be in the drawings, the engine assembly 12 will likely comprise an inline series of crankshaft bores 18 for operatively mounting the crankshaft 16. Fixedly secured within each crankshaft bore 18 is a friction-reducing, rotary-type journal bearing assembly, designated generally as 24. Clearance is provided between the journal bearing assembly 24 and journal portion of crankshaft 16 for the formation of a lubricating film therebetween. This lubricating film helps to minimize or otherwise prevent direct contact between the journal and bearing during rotation of the crankshaft 16. An oil supply channel 26 in the cylinder block 20 supplies oil 11 or other lubricating fluid from an oil sump 13 of ICE assembly 12 to the bearing 24 through a lubricant supply opening 28. While portrayed as having a right-circular cylindrical geometry, the crankshaft bore 18 and, thus, the complementary mating portions of the journal bearing assembly 24 may take on other shapes and sizes from those which are shown in the drawings.

Figure 2:
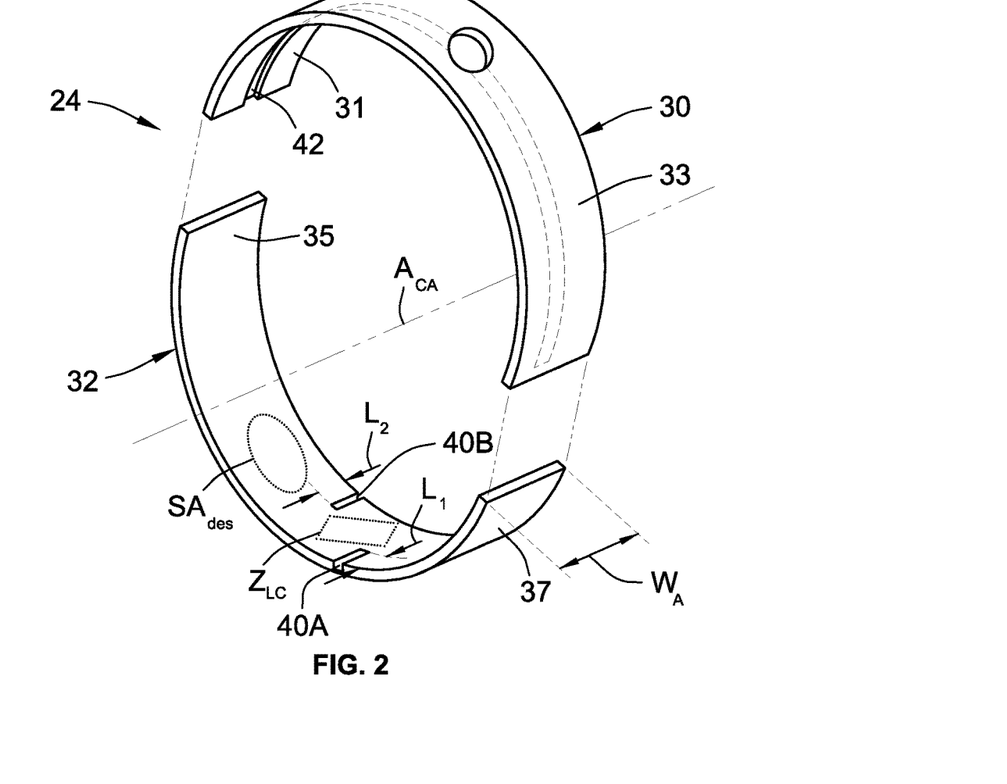
FIG. 2 is a partially exploded perspective-view illustration of a representative journal bearing assembly composed of an upper bearing shell insert attached to a lower bearing shell insert with an inner-diameter surface fabricated with recessed, axially elongated grooves in accordance with aspects of the present disclosure.

Referring next to FIG. 2, there is shown a partially exploded, perspective view illustration of the representative journal bearing assembly 24 of FIG. 1. While differing slightly in appearance, each of the journal bearing assemblies 24, 124, 224 and 324 presented in FIGS. 2-5 may incorporate, singly or in combination, any of the features and options disclosed above and below with respect to the other journal bearing assemblies, and vice versa. Moreover, many of the structural characteristics of the disclosed bearing assemblies 24, 124, 224, 324 can be substantially identical; thus, for purposes of brevity, these structural features may be described by way of reference to the assembly 24 presented in FIG. 2. For instance, the representative journal bearing assembly 24 of FIGS. 1 and 2 is a bipartite construction generally composed of two semicircular halves, namely a first (upper) bearing shell insert 30 and a second (lower) bearing shell insert 32, respectively, which meet in endwise abutment at split line 34 (FIG. 1). Each bearing shell insert 30, 32 may be fabricated (e.g., via casting, stamping, molding, machining, etc.) from a polymeric or a metallic material, such as low-friction, corrosion-resistant, and thermally conductive alloyed aluminum or surface-treated steel, as a single-piece structure with a semicircular body. While shown as a two-part construction, the journal bearing assembly 24 may comprise greater or fewer than two constituent parts.

Upper and lower bearing shell inserts 30, 32 mount inside the cylindrical crankshaft bore 18, e.g., via threaded fastener, splined engagement, interference fit, etc., such that the two inserts are juxtaposed with respective concavities thereof facing each other. First bearing shell insert 30, which is shown in FIG. 1 mounted along an upper extent of the bore 18, has opposing inner-diameter (ID) and outer-diameter (OD) surfaces 31 and 33, respectively. Conversely, the second bearing shell insert 32 is mounted along a lower extent of the bore 18, and is shown in FIG. 2 with opposing ID and OD surfaces 35 and 37, respectively. These arcuate ID surfaces 31, 35 of the bearing shell inserts 30, 32 are adjoined at opposing ends thereof to cooperatively define a cylindrical bearing channel 39 (FIG. 1) that receives therethrough the journal portion of the crankshaft 16. While shown as generally symmetrical halves of a toroid, it is certainly within the scope of this disclosure that each bearing shell insert have a distinct length and a distinct shape.

Throughout the drawings there are presented journal bearing assemblies designed to increase the supply of lubricant to designated bearing surface areas identified as prone to cavitation, and thereby delay the onset and minimize the extent of any surface cavitation. For the bearing assembly 24 of FIGS. 1 and 2, for example, the ID and/or OD surface 35, 37 of the lower bearing shell insert 32 is formed, machined, or otherwise fabricated with one or more axially elongated and/or axially angled recessed grooves that are engineered to transmit lubricant to a designated surface area $SA_{des}$ of the second ID surface 35. In the illustrated architecture, the second ID surface 35 of the second bearing shell insert 32 includes at least one axially elongated, recessed groove 40 (FIG. 1) that extends partially, but not completely, across the axial width WA of the insert 32. A first rectilinear groove 40A, for example, is oriented parallel to the central axis ACA of the journal bearing assembly 24, extending generally orthogonally from a first (leading) edge of the bearing shell insert 32. In the same vein, a second rectilinear groove 40B, which is also generally parallel to the central axis ACA, extends generally orthogonally from a second (trailing) edge of the lower bearing shell insert 32. It should be appreciated that the bearing shell insert 32 may be fabricated with greater or fewer than two grooves, and also appreciated that the assorted grooves may have similar or distinct shapes, sizes and/or orientations.

The first and second axially elongated grooves 40A, 40B of FIG. 2 are generally parallel, spaced circumferentially from each other with respect to the second ID surface 35 of the lower bearing shell insert 32. It may be desirable, for at least some applications, that first and second axial lengths $L_1$ and $L_2$ of the first and second axially elongated grooves 40A, 40B, respectively, be less than 40% or, for some embodiments, less than about 33% of the axial width $W_A$ of the insert 32. As shown, each groove has an axial length of approximately 12 millimeters (mm), a radial depth of approximately 200 μm, and a circumferential width of approximately 2 mm. For at least some applications, it is desirable that these axially elongated grooves 40A, 40B be spaced circumferentially from each other by about 10 to 50 degrees or, for some embodiments, at least about 20 degrees. For some embodiments, the grooves are not circumferentially spaced and, thus, are in line with each other. Optionally, the axially elongated grooves 40A, 40B are placed about 0 to 50 degrees upstream (e.g., for clockwise journal rotation in FIG. 2) from the location of a designated bearing surface area $SA_{des}$ identified as prone to cavitation.

This groove design helps to improve oil supply to reduce cavitation, while helping to maintain the integrity of the journal bearing assembly's load carrying zone $Z_{LC}$. During operation of the internal combustion engine assembly 12, lubricating oil will flow from the oil sump 13, down the oil supply channel 26, and through the lubricant supply opening 28 in the upper bearing shell insert 30. From the opening 28, oil will flow across a circumferentially elongated channel 42 that is recessed into the ID surface 31 of the insert 30, and then down onto the ID surface 35 of the lower bearing shell insert 32. Oil will then begin to accumulate at the bearing side chamfer—between the journal bearing assembly 24 and the bearing cap/crankcase 22—before flowing back to the oil sump 13, e.g., due to surface tension. The pressure of the oil may be ambient (i.e., unpressurized). Oil accumulated along the side of the bearing assembly 24 may then be drawn into the axially elongated grooves 40A, 40B, e.g., due to below-ambient development inside the bearing assembly, and subsequently transmitted to the bearing surface area $SA_{des}$ via the rotation of the crankshaft journal 16.

Figure 3A:
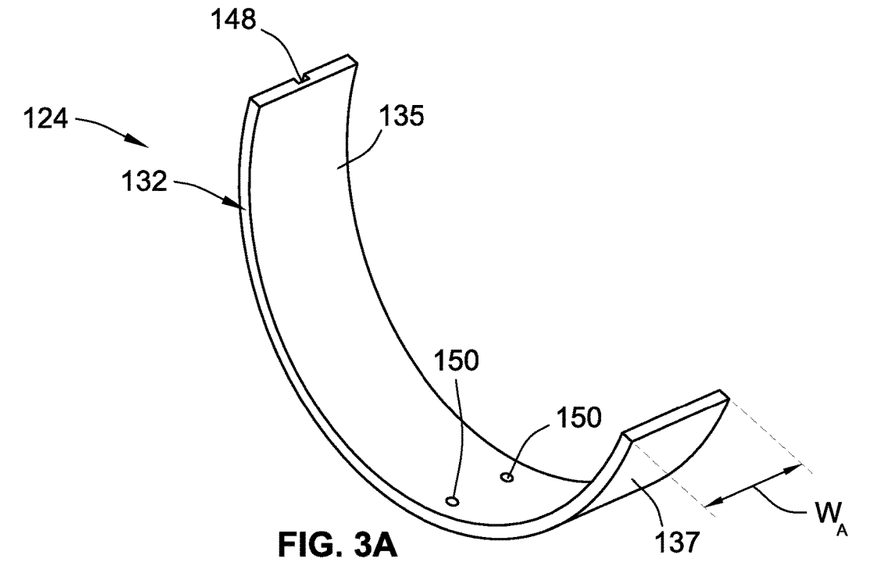
FIGS. 3A and 3B are top and bottom perspective-view illustrations, respectively, of a representative lower bearing shell insert with an outer-diameter surface fabricated with a backside oil groove fluidly coupled to a pair of through holes in accordance with aspects of the present disclosure.
Figure 3B:
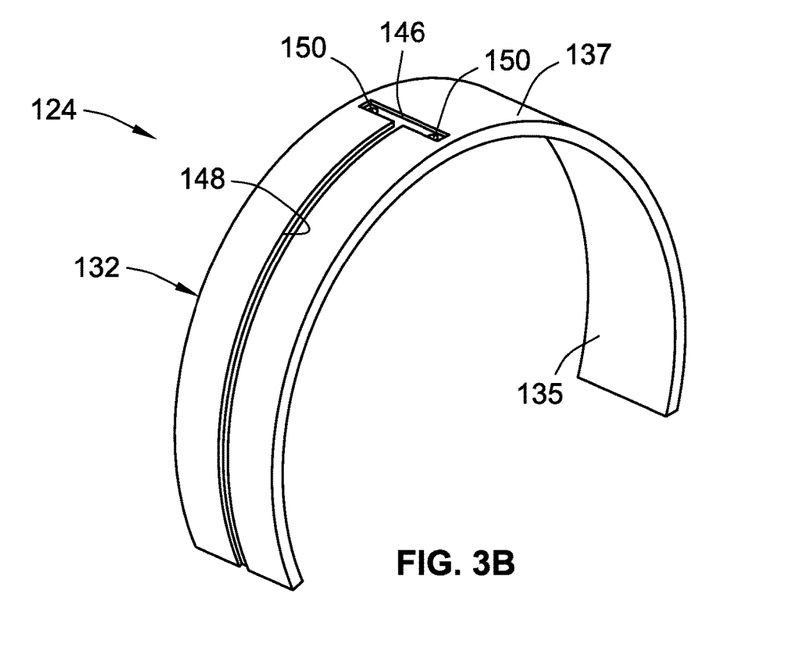

Referring next to FIGS. 3A and 3B, there is shown a select portion of another journal bearing assembly 124, namely a second (lower) bearing shell insert 132 with surface features for improved bearing oil supply. As indicated above, bearing shell insert 132 of FIGS. 3A and 3B may incorporate, singly or in combination, any of the features and options disclosed above and below with respect to the other inserts 32, 232, 332 or FIGS. 2, 4 and 5, respectively, and vice versa. By way of non-limiting example, the lower bearing shell insert 132 of FIGS. 3A and 3B may replace the lower bearing shell insert 32 of FIG. 2 and, thus, be used in conjunction with the upper bearing shell insert 30 for incorporation into the engine assembly 12 illustrated in FIG. 1. Like its counterpart of FIG. 2, lower bearing shell insert 132 of FIGS. 3A and 3B is configured to mount inside the cylindrical crankshaft bore 18 such that each opposing end of the insert's ID surface 135 adjoins with a respective opposing end of the ID surface 31 of the upper bearing shell insert 30.

For the bearing assembly 124 of FIGS. 3A and 3B, the OD surface 137 of the lower bearing shell insert 132 is formed, machined, or otherwise fabricated with an axially elongated recessed groove 146 that extends only partially across the axial width $W_A$ of the insert 132. An arcuate backside groove 148 is recessed into and extends circumferentially along the OD surface 137 of the lower bearing shell insert 132 from the rectilinear recessed groove 146 to one end of the insert 132, e.g., to fluidly couple the recessed groove 146 with the channel 42 in the ID surface 31 of the insert 30. As shown, the axially elongated recessed groove 146 includes one or more through holes 150 that transmit lubricant received from the circumferentially elongated backside groove 148 on the second OD surface 137 through the second bearing shell insert 132 to the second ID surface 135. Optionally, the two through holes 150 are spaced from each other at opposing ends of the recessed groove 146, and placed about 0 to 50 degrees upstream (e.g., for clockwise journal rotation in FIG. 3A) from the location of a designated bearing surface area $SA_{des}$ (FIG. 2) identified as prone to cavitation. For some embodiments, groove 148 can be fabricated in the bore 18 and intersect with channel 42 and through holes 150 or other direct oil supply.

Figure 4:
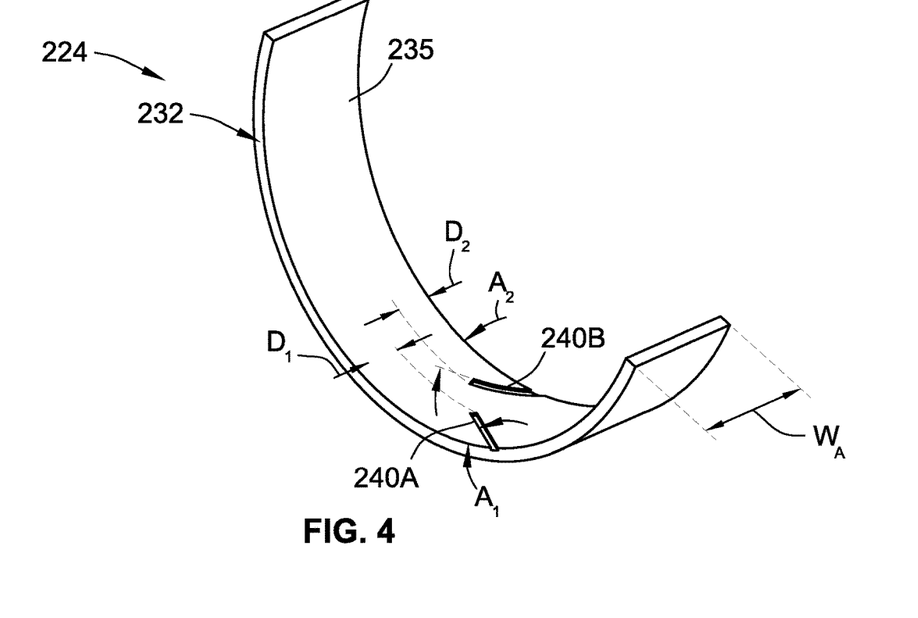
FIG. 4 is a perspective-view illustration of a representative lower bearing shell insert with an inner-diameter surface fabricated with recessed, angularly oriented oil grooves in accordance with aspects of the present disclosure.

Turning to FIG. 4, there is shown a select portion of yet another journal bearing assembly 224, namely a second (lower) bearing shell insert 232 with surface features for improved bearing oil supply to reduce surface cavitation. This bearing shell insert 232 may be modified to incorporate any of the features and options disclosed above and below with respect to the configurations presented in FIGS. 2, 3A, 3B and 5. In the illustrated architecture of FIG. 4, the second ID surface 235 of the second bearing shell insert 232 includes at least one axially angled, recessed groove that extends partially, but not completely, across the axial width $W_A$ of the insert 232. A first rectilinear groove 240A, for example, extends rearward at a first oblique angle $A_1$ from a first (leading) edge of the bearing shell insert 232, while a second rectilinear groove 240B extends forward at a second oblique angle $A_2$ from a second (trailing) edge of the lower bearing shell insert 232. It should be appreciated that the bearing shell insert 232 of FIG. 4 may be fabricated with greater or fewer than two grooves, where the assorted grooves may have similar or distinct shapes, sizes and/or angles.

The first and second axially angled grooves 240A, 240B of FIG. 4 project from their respective edges such that these grooves 240A, 240B are non-parallel and spaced circumferentially from each other with respect to the second ID surface 235 of the lower bearing shell insert 232. It may be desirable, for at least some applications, that first and second axial distances $D_1$ and $D_2$ between respective edges and terminating ends of the first and second axially angled grooves 240A, 240B, respectively, be less than 40% or, for some embodiments, less than about 33% of the axial width $W_A$ of the insert 232. For at least some applications, it is desirable that these grooves 240A, 240B be spaced circumferentially from each other by about 10 to 50 degrees or, for some embodiments, 30 degrees or more. The grooves could also be positioned in line with each other. Optionally, the grooves 240A, 240B are placed about 0 to 50 degrees upstream (e.g., for clockwise journal rotation in FIG. 4) from the location of a designated bearing surface area $SA_{des}$ (FIG. 2). The first and second oblique angles $A_1$ and $A_2$ of the first and second axially angled grooves 240A, 240B are approximately 10-60 degrees.

Figure 5:
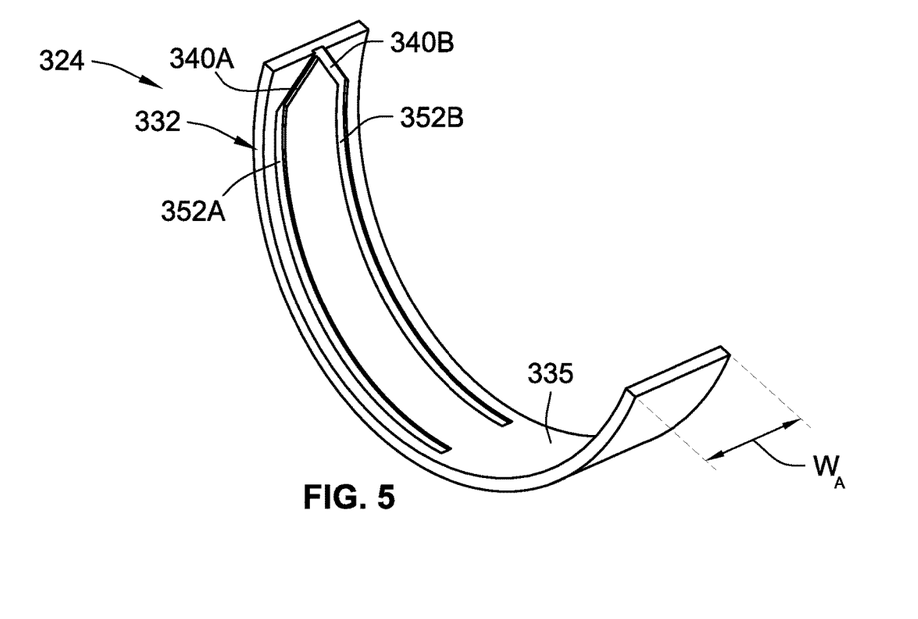
FIG. 5 is a perspective-view illustration of a representative lower bearing shell insert with an inner-diameter surface fabricated with two recessed, circumferentially elongated oil grooves connected via a V-shaped manifold groove in accordance with aspects of the present disclosure.

With reference to FIG. 5, there is shown a select part of another journal bearing assembly 324, namely a second (lower) bearing shell insert 332 with surface features for improved bearing oil supply to reduce surface cavitation. According to the example illustrated in FIG. 5, the ID surface 335 of the second bearing shell insert 332 is formed, machined or otherwise fabricated with first and second axially angled, recessed grooves 340A and 340B, respectively, that both extend from a common end of the insert 332, e.g., to fluidly connect to the channel 42 that is recessed into the ID surface 31 of the upper bearing shell insert 30 (FIG. 2). These two grooves 340A, 340B project at oblique angles from the end of the insert 332 such that the rectilinear grooves 340A, 340B extend only partially across the axial width $W_A$ of the insert and interconnect to form a V-shaped "manifold" groove. The second ID surface 335 further includes first and second generally parallel, circumferentially elongated ID grooves 352A and 352B. Each of these ID grooves 352A, 352B is fluidly coupled at one end thereof to a complementary end of a respective one of the axially angled grooves 340A, 340B.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present disclosure expressly includes any and all combinations and subcombinations of the preceding elements and features.

What is claimed is:

1. A journal bearing assembly for rotatably supporting a shaft passing through a bore, the journal bearing assembly comprising:
a first bearing shell insert configured to mount inside the bore and having a first arcuate inner-diameter (ID) surface terminating at opposing first circumferential ends and at opposing first axial edges thereof;
a second bearing shell insert configured to mount inside the bore and having a second arcuate ID surface terminating at opposing second circumferential ends and at opposing second axial edges thereof, the second arcuate ID surface adjoined at the opposing second circumferential ends thereof with the opposing first circumferential ends of the first ID surface to cooperatively receive therethrough a journal portion of the shaft,
wherein the second ID surface of the second bearing shell insert includes a first axially elongated groove extending orthogonally inward from a first one of the opposing second axial edges only partially across an axial width of the second bearing shell insert, and a second axially elongated groove extending orthogonally inward from a second one of the opposing second axial edges only partially across the axial width of the second bearing shell insert.

2. The journal bearing assembly of claim 1, wherein the first and second axially elongated grooves are parallel and spaced circumferentially from each other with respect to the second ID surface of the second bearing shell insert.

3. The journal bearing assembly of claim 1, wherein first and second axial lengths of the first and second axially elongated grooves, respectively, are each less than 40% of the axial width of the second bearing shell insert, and wherein the first and second axially elongated grooves are spaced circumferentially from each other by about 20 to 50 degrees with respect to the second ID surface.

4. The journal bearing assembly of claim 1, wherein the second ID surface of the second bearing shell insert further includes an axially angled recessed groove extending inward from one of the opposing second axial edges only partially across the axial width of the second bearing shell insert.

5. The journal bearing assembly of claim 4, wherein the axially angled recessed groove includes a first axially angled groove extending at a first oblique angle from a first one of the opposing second axial edges of the second ID surface, and a second axially angled groove extending at a second oblique angle from a second one of the opposing second axial edges of the second ID surface.

6. The journal bearing assembly of claim 5, wherein the first and second axially angled grooves are non-parallel and spaced circumferentially from each other with respect to the second ID surface of the second bearing shell insert.

7. The journal bearing assembly of claim 6, wherein the first and second oblique angles of the first and second axially angled grooves are approximately 10-60 degrees, and wherein the first and second axially angled grooves are spaced circumferentially from each other by about 30 degrees or less.

8. The journal bearing assembly of claim 1, wherein a second outer-diameter (OD) surface of the second bearing shell insert includes an axially elongated backside recessed groove extending only partially across the axial width of the second bearing shell insert.

9. The journal bearing assembly of claim 8, wherein the second OD surface further includes a circumferentially elongated backside groove that is fluidly coupled to the axially elongated backside recessed groove, the axially elongated backside recessed groove including a through hole configured to transmit lubricant received from the circumferentially elongated backside groove on the second OD surface through the second bearing shell insert to the second ID surface.

10. The journal bearing assembly of claim 1, wherein the first and the second bearing shell inserts are each formed as a single-piece semicircular structure.

11. A motor vehicle, comprising:
a vehicle body defining an engine compartment;
an internal combustion engine (ICE) assembly stowed in the engine compartment, the ICE assembly including an oil sump, an engine block with a crankshaft bore, and a crankshaft passing through the crankshaft bore; and
a journal bearing assembly including:
an upper shell insert with a first single-piece semicircular body mounted inside the crankshaft bore and having a first arcuate inner-diameter (ID) surface terminating at opposing first circumferential ends and at opposing first axial edges thereof, the first ID surface including a circumferentially elongated channel configured to receive oil from the oil sump of the ICE assembly;
a lower shell insert with a second single-piece semicircular body mounted inside the crankshaft bore and having a second arcuate ID surface terminating at opposing second circumferential ends and at opposing second axial edges thereof, the second arcuate ID surface adjoined at the opposing second circumferential ends thereof with the opposing first circumferential ends of the first ID surface to cooperatively define a cylindrical bearing channel receiving therethrough a journal portion of the crankshaft, wherein the second ID surface of the lower shell insert includes first and second axially elongated recessed grooves each extending orthogonally inward from a respective one of the opposing second axial edges only partially across an axial width of the lower shell insert, the first and second axially elongated grooves being configured to transmit oil received by the upper shell insert to a predetermined surface area of the second ID surface.

12. A method of manufacturing a journal bearing assembly for rotatably supporting a shaft passing through a bore, the method comprising:

fabricating a first bearing shell insert configured to mount inside the bore and having a first arcuate inner-diameter (ID) surface terminating at opposing first circumferential ends and at opposing first axial edges thereof; and fabricating a second bearing shell insert configured to mount inside the bore and having a second arcuate ID surface terminating at opposing second circumferential ends and at opposing second axial edges thereof, the second arcuate ID surface adjoined at the opposing second circumferential ends thereof with the opposing first circumferential ends of the first ID surface to cooperatively receive therethrough a journal portion of the shaft;

wherein the second ID surface of the second bearing shell insert is fabricated with a first axially elongated groove extending orthogonally inward from a first one of the opposing second axial edges only partially across an axial width of the second bearing shell insert, and a second axially elongated groove extending orthogonally inward from a second one of the opposing second axial edges only partially across the axial width of the second bearing shell insert.

13. The method of claim 12, wherein the first and second axially elongated grooves are parallel and spaced circumferentially from each other with respect to the second ID surface of the second bearing shell insert.

14. The method of claim 12, wherein the second ID surface of the second bearing shell insert further includes an axially angled recessed groove extending only partially across the axial width of the second bearing shell insert.

15. The method of claim 12, wherein a second outer-diameter (OD) surface of the second bearing shell insert includes an axially elongated backside recessed groove extending only partially across the axial width of the second bearing shell insert.

16. The method of claim 12, wherein fabricating the first and the second bearing shell inserts includes casting, stamping, or molding each of the bearing shell inserts as a single-piece semicircular structure.

17. The journal bearing assembly of claim 1, wherein the first and second axially elongated grooves are rectilinear and have rectangular axial cross-sections.

18. The journal bearing assembly of claim 1, wherein the first and second axially elongated grooves sandwich therebetween a load carrying zone.

19. The method of claim 12, wherein the first and second axially elongated grooves are rectilinear and have rectangular axial cross-sections.

20. The method of claim 12, wherein the first and second axially elongated grooves sandwich therebetween a load carrying zone.

* * * * *